(12) United States Patent
Hirose

(10) Patent No.: US 6,357,177 B1
(45) Date of Patent: Mar. 19, 2002

(54) BOTTOM SAND FOR GROWING AQUATIC PLANTS AND AQUARIUMS FOR GROWING AQUATIC PLANTS USING BOTTOM SAND

(75) Inventor: Mitsuru Hirose, Chiba (JP)

(73) Assignee: Hirose Co., Ltd., Narashino (JP)

( * ) Notice: Subject to any disclaimer, the term of this patent is extended or adjusted under 35 U.S.C. 154(b) by 0 days.

(21) Appl. No.: 09/549,695

(22) Filed: Apr. 14, 2000

(30) Foreign Application Priority Data

Oct. 7, 1999 (JP) .......................... 11-286806
Oct. 21, 1999 (JP) .......................... 11-299889

(51) Int. Cl.[7] .................. A01G 31/00; A01K 63/00
(52) U.S. Cl. ................... 47/59; 47/62 R; 119/245
(58) Field of Search ................. ; 47/59, 62 R; 119/245; A01G 31/00

(56) References Cited

U.S. PATENT DOCUMENTS 4,034,506 A * 7/1977 Kasahara et al. ............. 47/64
4,211,034 A * 7/1980 Piesner ........................ 47/62
4,315,381 A * 2/1982 Dvorin ........................ 47/59
5,056,260 A * 10/1991 Sutton ........................ 47/59

FOREIGN PATENT DOCUMENTS

JP 08256636 A * 10/1996 .......... A01K/63/04

OTHER PUBLICATIONS www.notcatfish.com, Equipment & Décor, A Guide to the Substrate, written Apr. 1999, p. 1 and 2.*

* cited by examiner

Primary Examiner—Charles T. Jordan
Assistant Examiner—Andrea M. Valenti
(74) Attorney, Agent, or Firm—Richard M. Goldberg

(57) ABSTRACT

Bottom sand for growing aquatic plants containing a granular sinter consisting essentially of volcanic ash and having a bonding strength to collapse when a pressure of 2.5 kg/cm$^2$ or above is applied on a 1.0 cm thick layer. This bottom sand permits good filtration of water and satisfactory growing of aquatic plants. Aquariums using such bottom sand not only purify the water but also assures satisfactory growth of aquatic plants placed in the aquariums.

14 Claims, 3 Drawing Sheets

BOTTOM SAND FOR GROWING AQUATIC PLANTS AND AQUARIUMS FOR GROWING AQUATIC PLANTS USING BOTTOM SAND

BACKGROUND OF THE INVENTION

This invention relates to bottom sand for growing aquatic plants in aquariums and aquariums for growing aquatic plants using such bottom sand.

Recently, growing plants in water contained in aquariums, sometimes with pet fish, has become popular.

In hydroponics, it is essential to circulate and filter the water in order to prevent it from becoming turbid and opaque.

Meanwhile, the sand laid at the bottom of aquariums is required to serve as a medium to support the plants. Nevertheless, there has been no technical concept to use such bottom sand in aquariums for both efficient filtering of water and efficient growing and support of aquatic plants.

The object of this invention is to provide bottom sand that permits both efficient purification of water and efficient growing and support of plants and aquariums for growing aquatic plants using such bottom sand as illustrated in FIG. 3.

SUMMARY OF THE INVENTION

To solve the problem described above, granular sinter consisting essentially of volcanic ash is added to the bottom sand. The granular sinter has such a bonding strength that granules crush when a pressure of about 2.5 kg/cm$^2$ or less is applied to a layer of the sinter 1.0 cm thick. The aquarium according to this invention comprises a layer of bottom sand of the type described above and has a water-circulating system installed or included therein.

DETAILED DESCRIPTION OF THE INVENTION

Figure 1:
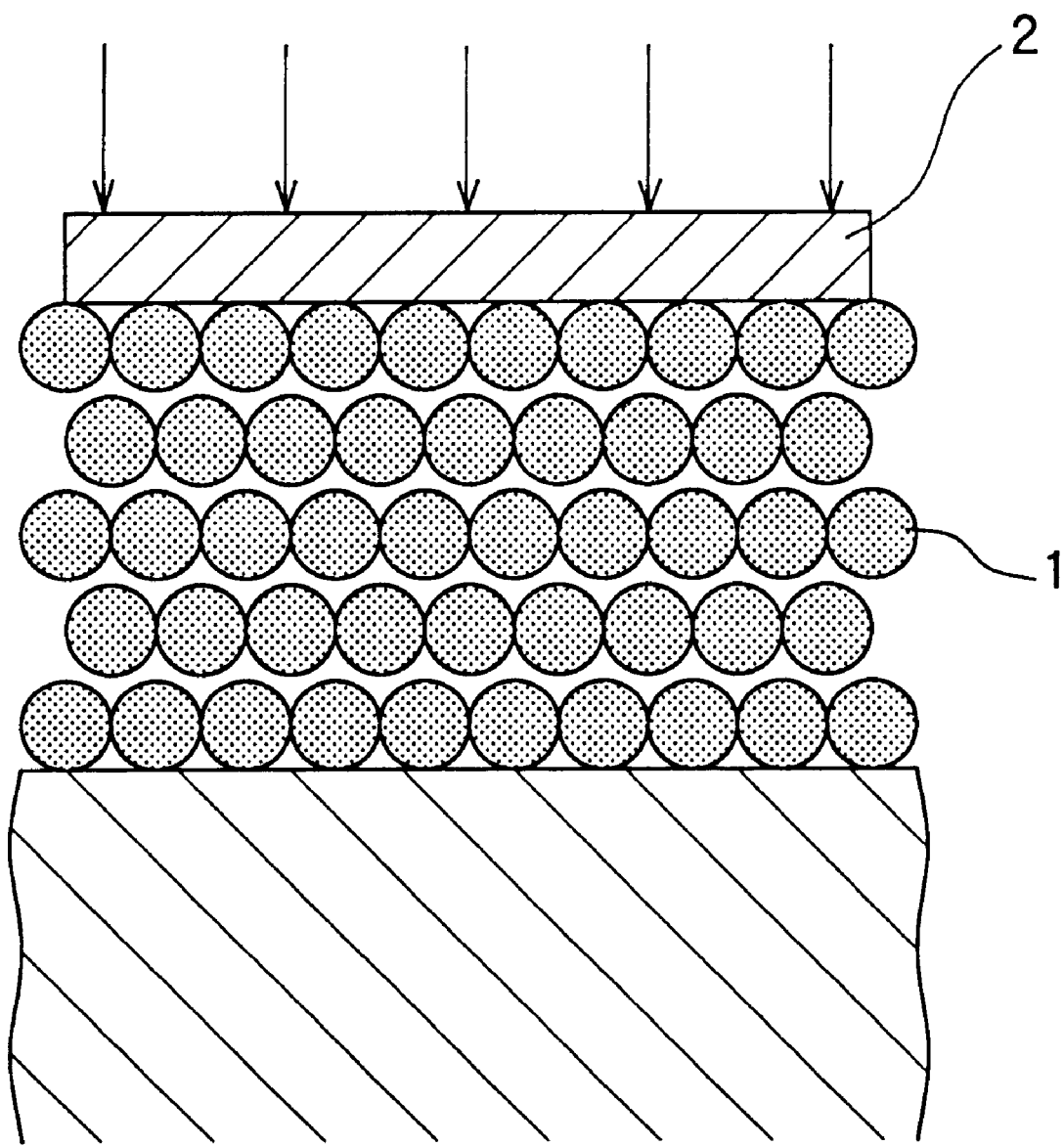
FIG. 1 is a cross-sectional view showing a 1.0 cm thick layer of granular sinter consisting essentially of volcanic ash under a crushing pressure.
Figure 3:
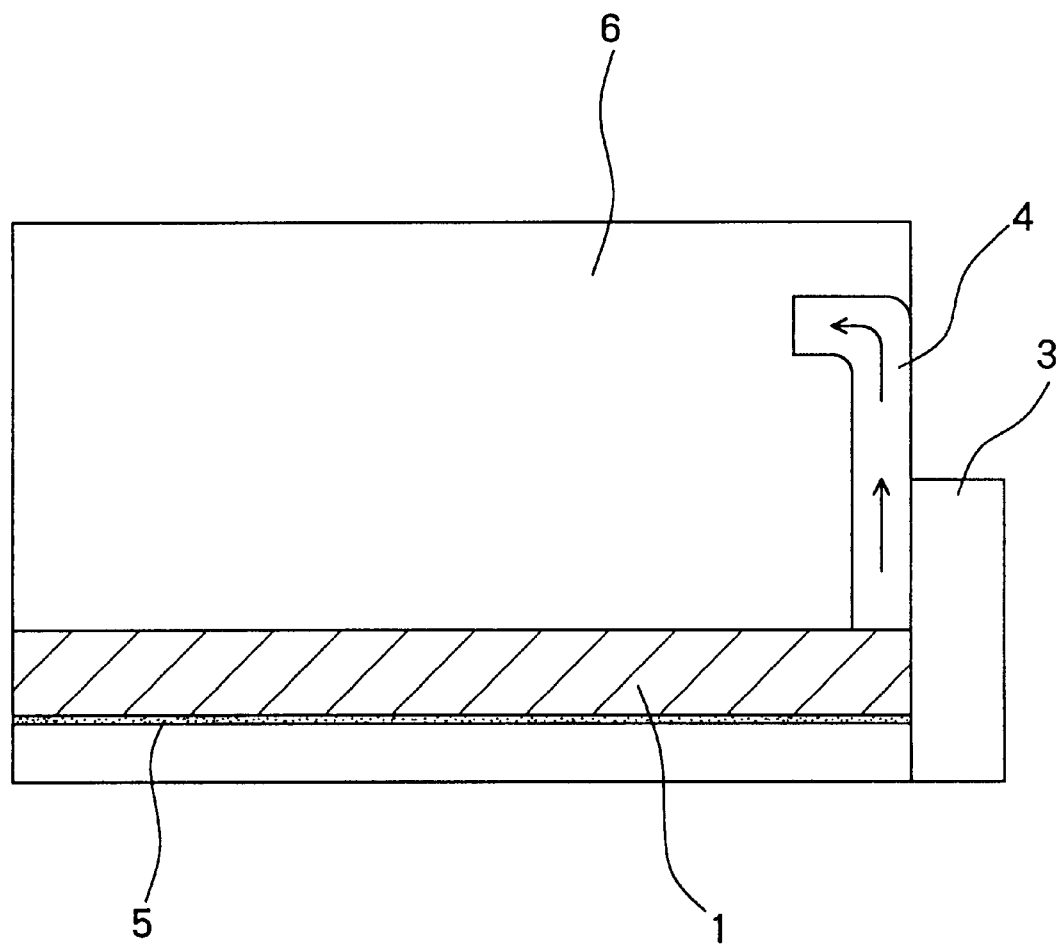
FIG. 3 is a front view of an aquarium of this invention containing the bottom sand laid at the bottom of the aquarium. (The figure shows only that side of the water-circulating pipe which discharges water. The side of the water-circulating pipe which sucks in water below the filter is not shown.)

As shown in FIG. 1, there is a 1.0 cm thick layer of granular sinter 1 consisting essentially of volcanic ash under a plate 2 applying a crushing pressure. In FIG. 3, the layer of granular sinter 1 is positioned above the filter 5 in an aquarium 6 having a water-circulating pipe 4 which discharges water and which sucks in water below the filter. Element 3 is the water pump associated with pipe 4 for sucking and discharging the water.

Sinter consisting essentially of volcanic ash agglomerating fine particles of volcanic ash by sintering has fine pores at the surface thereof. The fine pores filter and adsorb impurities from the water. If the sinter has too high a bonding strength (crushing strength), the aquatic plants can neither penetrate their roots into the sinter nor, as such, absorb nutrients therefrom.

Accordingly, it is essential that the sinter has such a bonding strength as to permit the aquatic plants to penetrate their roots into fine pores formed therein.

The sinter, according to this invention, permits satisfactory growth of aquatic plants in the aquarium when the bonding strength is such that the sinter is crushed under pressure of about 2.5 kg/cm$^2$ or less when it is laid in a thickness of 1 cm. Preferably, the sinter has a crushing pressure of from about 1 kg/cm$^2$ to about 2.5 kg/cm$^2$ and more preferably, a crushing pressure from about 1.25 kg/cm$^2$ to about 2.25 kg/cm$^2$.

The volcanic ash sinter can be prepared by heating a mixture of volcanic ash and water optionally containing at least one of from 0.1% to 1.5% by weight of alcoholic metal carbonate and 0.5% to 2.5% by weight of alkaline earth metal carbonate, based on the weight of the sinter, in an externally heated, rotating, inclined kiln. The feed mixture of volcanic ash and water preferably contains from about 10% to about 60% by weight.

The amount of water in the mixture is not critical but is used in amounts which permit easy handling of the mixture of water based on the weight of the mixture. A mixture having the consistency of a light to heavy mud has been found suitable. The mixture is sintered by heating to a temperature of about 100° C. to about 300° C. preferably from about 100° C. to about 200° C. in the kilm. The sinter is heated to reduce the moisture content to less than about 10% by weight of the sinter. The sinter leaving the kiln containing at least 0.5% water and preferably from about 0.5% to 5.0% and most preferably from 0.75% to about 3.5% water by weight of the sinter. If the water level is reduced below about 0.5% by weight of the sinter, the sinter loses the granular structure. If too much moisture remains in the sinter, the sinter lacks adhesive strength to maintain a granular form in water. Preferably, the mixture comprising volcanic ash and water optionally containing at least one of alkali metal and alkaline earth metal carbonates is heated to a temperature of from 100° C. to 200° C. and at a water content of from 1% to 3% by weight. Most preferably, the mixture of volcanic ash and water is heated to a temperature of from about 110° C. to about 160° C. to provide a volcanic ash sinter having a crushing strength of from about 1 kg/cm to about 2.5 kg/cm$^2$ at a thickness of 1 cm.

The heating temperature, feed rate, and final moisture content can be easily adjusted to provide the granular sinter particles with the required crushing strength of from about 1 kg/cm to about 2.5 kg/cm$^2$ when measured at a thickness of 1 cm.

The preferred process for preparing the sinter as stated above. However, other means for heating, agglomerating and drying the aqueous mixture can be used to form the sintered volcanic ash used in the practice of the invention.

The present invention will be described based on the results of experiments.

Three aquariums, 38 cm long by 24 cm wide by 30 cm high, each containing 23 liters of water and having a bottom filter (the Bio Filter 45 manufactured by Nisso Co., Ltd.) and a 2.5 cm thick layer of bottom sand consisting essentially of sintered volcanic ash were prepared. The water was circulated at a rate of 1 liter per minute by using an air pump.

The granular sinter in the three aquariums a, b and c had a crushing strength when laid in a thickness of 1.0 cm, at pressures of 2.0 kg/cm$^2$, 2.5 kg/cm$^2$ and 3.0 kg/cm$^2$, respectively. Parsley and watercress were grown in the aquariums.

The growth of the plants in the aquariums is shown in the following table. (The weights shown are those of stems and leaves, without including roots.)

|  | Aquarium | | | | | |
|---|---|---|---|---|---|---|
|  | a | | b | | c | |
| Plant | Weight at the start | Weight after 60 days | Weight at the start | Weight after 60 days | Weight at the start | Weight after 60 days |
| Parsley | 4.5 g | 48.5 g | 4.4 g | 43.7 g | 4.5 g | 38.7 g |
| Watercress | 5.3 g | 59.0 g | 6.0 g | 51.3 g | 5.9 g | 37.7 g |

As can be seen, aquatic plants grow efficiently in aquariums when the sinter consisting essentially of volcanic ash, has such a crushing strength, when laid in a thickness of 1.0 cm as shown in FIG. 1, as to be crushed under a pressure of about 2.5 kg/cm$^2$ or less.

Essentially, the bottom sand according to this invention, contains a sinter consisting essentially of volcanic ash having a crushing strength at the level described above.

The bottom sand of this invention comprises either the sinter alone or mixtures of the sinter and other solids. The aquarium according to this invention comprises an aquarium containing said bottom sand laid at the bottom thereof, with a water-circulating system installed therein, as shown in FIG. 3.

Embodiments

Embodiments of this invention are described below.

[Embodiment 1]

This embodiment shows the effect on filtration of mixing a sinter of volcanic ash with gravel; the gravel itself has little water filtration function. Therefore, adding a certain proportion of the bottom sand of the sinter according to this invention provides a satisfactory filtration function.

Six aquariums of the same design and size as those used in the experiment described above were prepared and each was filled with 23 liters of water. After adding 0.27 g of methylene blue, a dyeing agent, the bottom filter described earlier was laid.

A sinter of volcanic ash having such a crushing strength that a 1.0 cm thick layer of the granular sinter is crushed under a pressure of 2.5 kg/cm$^2$ was mixed with gravel. Varying volume percentages of the sinter were mixed with gravel and the mixtures obtained were placed in the bottom of the six aquariums to form a layer approximately 2.5 cm thick. The volume percentages of the sinter mixed with the gravel are shown below.

| Aquarium No. | Volume Percentage of Sinter |
|---|---|
| 1 | 0 |
| 2 | 5 |
| 3 | 10 |
| 4 | 20 |
| 5 | 30 |
| 6 | 100 |

As in the experiment described before, the water was circulated at a rate of 1 liter per minute using an air pump. A beam of light was projected from one side of each aquarium through the 38 cm length using a projector (the Pentax Slide 501 manufactured by Asahi Optical Co., Ltd.) having a light bulb of 100 watts at 100 volts and a projection lens of 72 mm diameter and 24 cm focal length. The luminous intensity was measured on the opposite side of the aquarium using an illuminometer that can measure the brightness between 0 and 200,000 lux.

Figure 2:
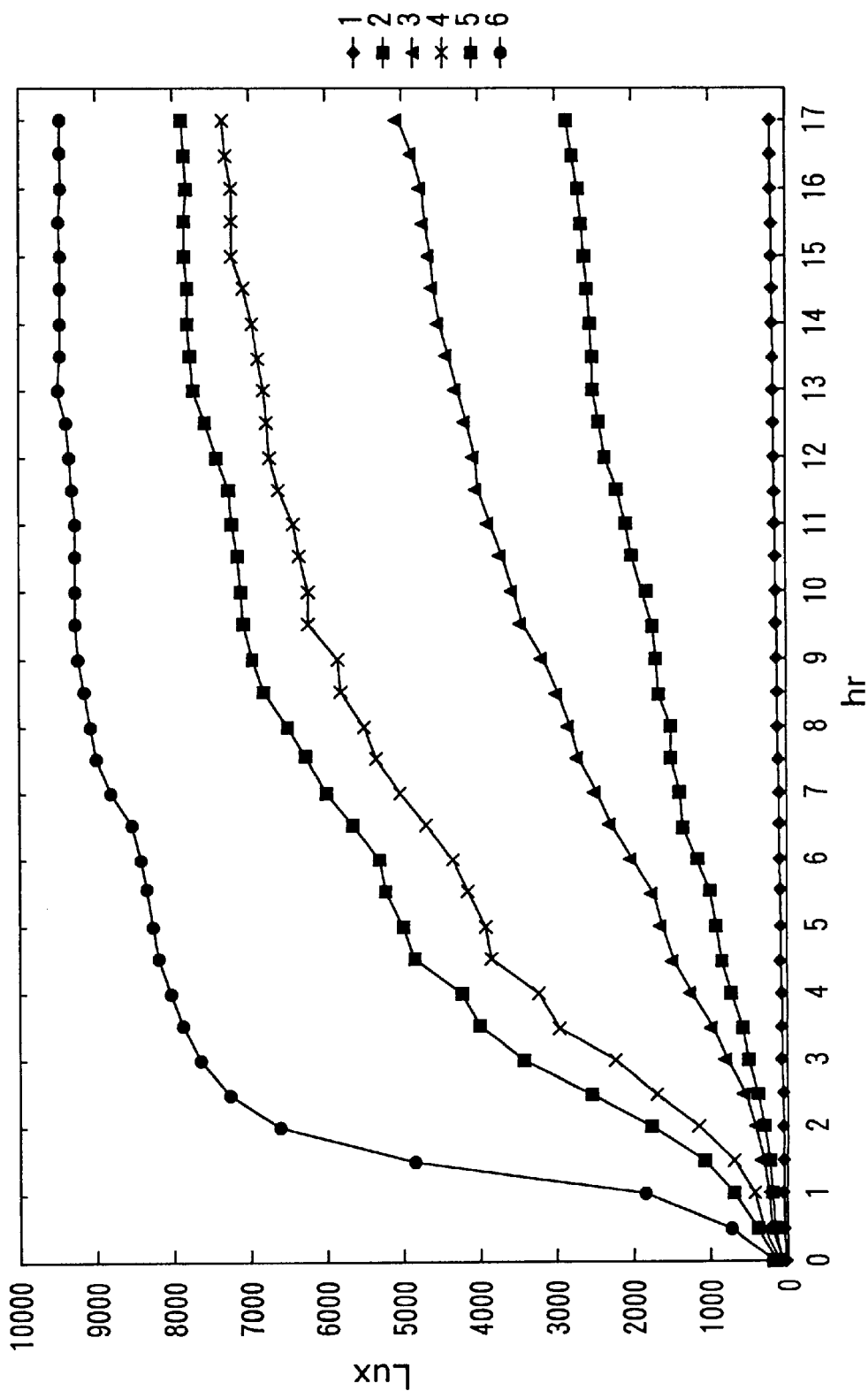
FIG. 2 graphically shows the relationship between the lapse of time and the level of illumination expressed in lux in Embodiment 1.

The brightness of the light passing through each aquarium changed with time as shown in the graph of FIG. 2.

When the sinter content was 0 percent, the illumination scarcely changed. When the sinter content rose to 5 percent, the sinter absorbed methylene blue as the water was circulated. The water was purified by filtration. The rate and degree of filtration and purification increased as the percentage of the sinter increased.

Thus, when the volume percentage of the sinter in the mixture of the sinter and gravel is 5 percent or more, sufficient levels of filtration and purification can be achieved.

[Embodiment 2]

Generally volcanic ash contains a very small quantity of sulfuric acid.

When a mixture of volcanic ash and an alkali metal carbonate or alkaline-earth metal carbonate is sintered, sulfuric acid in the sinter gradually dissolves in the water; dissolution of the carbonate causes a buffer action that precludes a sharp rise of pH. This permits keeping the pH value of the water in the aquarium within a desired range for a long time.

To achieve the neutralization and buffering of sulfuric acid, the sinter should contain 0.1 to 1.5 weight percent of an alkali metal carbonate or 0.5 to 2.5 weight percent of an alkaline-earth metal carbonate.

Thus, this embodiment promotes the cultivation of aquatic plants while purifying water by keeping the pH value at an appropriate level.

Effects of the Invention

As described above, this invention fulfills two indispensable requirements for aquatic plants; i.e., water purification and satisfactory growth support.

Furthermore, aquariums using the bottom sand of this invention permit growing not only aquatic plants alone but also tropical fish, fireflies or other aquatic animals, thereby adding to the ornamental effect.

Thus, this invention is a significant contribution to the growing and appreciation of aquatic plants and animals in aquariums.

What is claimed is:

1. A hydroponic growth support medium comprising granular sintered volcanic ash having a crushing strength not exceeding about 2.5 kg/cm$^2$ when applied to a layer of granular sintered volcanic ash 1.0 cm. thick.

2. The hydroponic growth support medium of claim 1 when the sinter has a crushing strength of from about 1 kg/cm$^2$ to about 2.25 kg/cm$^2$ when applied to a layer 1 cm thick.

3. The hydroponic growth support medium of claim 2 comprising gravel and wherein the sinter comprises at least about 5 volume percent of the growth support medium.

4. The hydroponic growth support medium of claim 1 wherein the sintered volcanic ash further comprises at least one member selected from the group consisting of from about 0.1 to about 1.5 percent by weight of an alkali metal carbonate and from about 0.5 to about 2.5 percent by weight of an alkaline earth metal carbonate.

5. The hydroponic growth support medium of claim 4 comprising gravel and wherein the sinter comprises at least about 5 volume percent of the growth support medium.

6. The hydroponic growth support medium of claim 1 comprising gravel and wherein the sinter comprises at least about 5 volume percent of the growth support medium.

7. An aquarium for growing aquatic plants containing growth support medium comprising: a tank, a granular sinter comprising sintered volcanic ash having a crushing strength not greater than about 2.5 kg/cm$^2$ applied to a 1.0 cm thick layer thereof and a water circulating system.

8. The aquarium of claim 7 in which the growth support medium comprises a mixture of gravel and sintered volcanic ash, the sintered volcanic ash comprising at least about 5 volume percent of the mixture.

9. The aquarium of claim 8 wherein the sintered volcanic ash has a crushing strength of from about 1 kg/cm$^2$ to about 2.25 kg/cm$^2$ applied to a 1.0 cm thick layer of said sintered volcanic ash.

10. The aquarium of claim 8 in which the sintered volcanic ash contains at least one member selected from the group consisting of from about 0.1 to about 1.5 weight percent of an alkali metal carbonate and from about 0.5 to about 2.5 weight percent of an alkaline-earth metal carbonate.

11. The aquarium of claim 10 wherein the sintered volcanic ash has a crushing strength of from about 1 kg/cm$^2$ to about 2.25 kg/cm$^2$ applied to a 1.0 cm thick layer of said sintered volcanic ash.

12. The aquarium of claim 7 in which the sintered volcanic ash contains at least one member selected from the group consisting of from about 0.1 to about 1.5 weight percent of an alkali metal carbonate and from about 0.5 to about 2.5 weight percent of an alkaline-earth metal carbonate.

13. The aquarium of claim 12 wherein the sintered volcanic ash has a crushing strength of from about 1 kg/cm$^2$ to about 2.25 kg/cm$^2$ applied to a 1.0 cm thick layer of the sintered volcanic ash.

14. The aquarium of claim 7 wherein the sintered volcanic ash has a crushing strength of from about 1 kg/cm$^2$ to about 2.25 kg/cm$^2$ applied to a 1.0 cm thick layer of said sintered volcanic ash.

* * * * *